A. BALL.
Magazine Fire-Arms.
No. 8,110. Reissued Feb. 26, 1878.
fig. 1
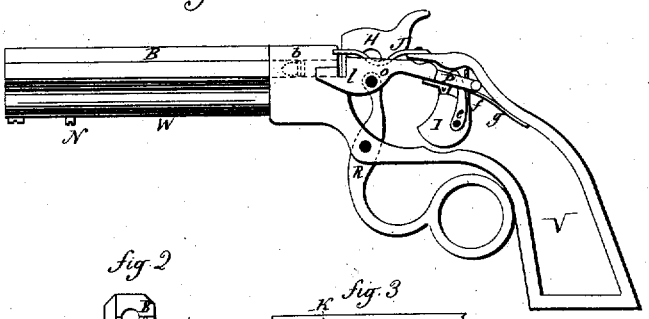
fig. 2
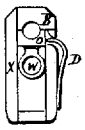
fig. 3
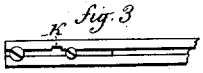
fig. 4
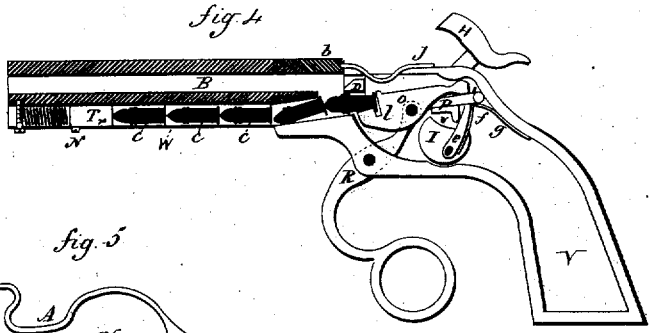
fig. 5
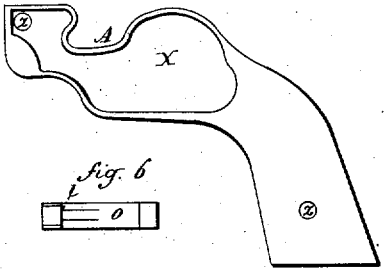
fig. 6
Witnesses.
J. H. Chumrey
H. A. Wilson
Albert Ball
Inventor.
By atty.
Wm. E. Earle
N. PETERS, PHOTO-LITHOGRAPHER, WASHINGTON, D. C.

UNITED STATES PATENT OFFICE.

ALBERT BALL, OF WORCESTER, MASSACHUSETTS.

IMPROVEMENT IN MAGAZINE FIRE-ARMS.

Specification forming part of Letters Patent No. 38,935, dated June 23, 1863; Reissue No. 1,635, dated March 15, 1864; Reissue No. 8,110, dated February 26, 1878; application filed January 24, 1878.

*To all whom it may concern:*

Be it known that I, ALBERT BALL, of Worcester, in the county of Worcester and State of Massachusetts, have invented a new Improvement in Self-Loading Fire-Arms; and I do hereby declare the following, when taken in connection with the accompanying drawings and the letters of reference marked thereon, to be a full, clear, and exact description of the same, and which said drawings constitute part of this specification, and represent, in—

Figure 1, side view, with the side of the frame removed; Fig. 2, transverse section; Fig. 4, longitudinal section; Figs. 3, 5, and 6, detached views.

This invention relates to improvements in that class of fire-arms known as "magazine."

The fire-arm represented in the drawings is a repeating-pistol; but my invention is equally applicable to a rifle, a musket, or a carbine.

The several cartridges (which are what is termed "fixed ammunition") are contained within a tube or magazine, which is situated underneath and parallel with the barrel, as represented in the drawings, in which B denotes the barrel, and W the magazine, both open at the breech end. The frame V is constructed to receive the mechanism of the arm, and at its forward end *b* the barrel and magazine are attached.

In the frame, directly in rear of the open end of the barrel, a vertical chamber is formed, into which the cartridges from the magazine successively pass, and are thence transferred to the barrel. In this vertical chamber in the frame a cartridge-carrier, *o*, is arranged.

The cartridge-chamber is partially constructed in the frame at the rear end of the barrel, and the remainder of the cartridge-chamber formed in the cartridge-carrier *o*, Figs. 1 and 4.

In my invention the cartridge-carrier is employed not only for receiving a cartridge from the magazine and transporting it to and inserting it within the charge-chamber, and so to be ready for being exploded, but is also subsequently employed, or, after discharge, for extracting the cartridge-shell. Furthermore, the cartridge-carrier is so made as to enable the shell, after having been so withdrawn, to be ejected laterally from the carrier by the action of a spring or other device.

The several cartridges, as arranged within the magazine, are exhibited at C C C, the rear-most one being placed within the carrier *o*. This carrier, formed as shown in Figs. 1, 2, and 4, is jointed to a trigger-guard lever, R, by means of which the elevation and depression of the carrier is effected.

P is a "locking-piece," or device for preventing the carrier *o* from being driven backward during the discharge of a cartridge. This locking-piece has a flange or projection, *v*, which rests on a tumbler, I, and is provided with a spring, *g*, the object of which is to effect the elevation of the locking-piece.

H is the hammer, on the pivot-pin of which the tumbler I is fixed. This tumbler carries a lever-catch, *e*, by which the locking-piece P is drawn downward and away from the carrier *o* at the proper time, preparatory to being moved backward and downward with respect to the barrel or its portion of the cartridge-chamber. A small spring, *f*, applied to the catch *e*, operates to keep the catch in proper connection with the locking-piece P. The side plate or cover X (shown in Fig. 5) is secured to the frame V by means of screws *z z* in said figure. This side plate is recessed or notched at A, in rear of the open breech end of the magazine, for a twofold purpose—that is to say, not only in order that the cartridges may be introduced through the notch A into the magazine, but that the shells, after explosion, may be successively ejected from the cartridge-carrier.

Each of the cartridges used in my said fire-arm has a copper or metallic shell or powder-cup, which not only contains the powder and ball, but has a flange at its rear end for holding the percussion-powder, the form of the cartridge being as shown in Fig. 4. The flange, when the cartridge is on the carrier *o*, rests within a corresponding recess or groove, *l*, formed at the rear, as seen in Fig. 4. The head of the cartridge rests against a shoulder on the carrier, which, when the cartridge is within the chamber of the barrel, constitutes a breech for the barrel. The chamber is partly formed in the frame and partly in the carrier *o*. The shell of the cartridge, when in the charge-chamber, overlaps the joint between the front end of the carrier *o* and its next adjacent part of the frame. Thus the joint will be protected by the shell from the action of the gases resulting from the explosion. The flange of the cartridge serves to make a close joint at the breech or rear end of the chamber.

A helical spring, *s*, placed within the magazine, and in advance of the cartridges, serves, by means of a follower, T, to press them backward toward the cartridge-carrier *o*, as occasion may require. This follower has a small projection or knob, N, extending from it, and through a groove, *r*, made longitudinally in the magazine. The knob N serves as a means for contracting the spring *s*, or by which the follower is moved forward preparatory to the charging of the magazine with cartridges. A lateral notch, K, (see Fig. 3,) serves to receive the knob, and to hold the follower stationary during the introduction of the cartridges into the magazine.

With the carrier *o* there is employed a cartridge-shell ejector or spring, D. (See Figs. 2 and 4.) During the forward movement of the carrier *o* it will press back the spring, which, as soon as the carrier may have been retracted, will be free to act against the cartridge-shell and eject it laterally from the carrier. J is a spring or guard by which the cartridge, while being raised up by the carrier *o*, is maintained in place thereon.

The operation of the fire-arm is as follows: Preparatory to charging the magazine with cartridges, the spring *s* is contracted, and should be held so by turning the knob N laterally into the notch K. The cartridge-carrier *o* having been depressed to its lowest position, the cartridges should be successively inserted through the recess A in the side of the frame, and into the magazine, after which the knob N should be turned out of the notch K, in order that the follower, by means of the spring, may be forced against the row of cartridges, and press them toward the carrier *o*. Then, by turning the lever R upward toward the stock, the carrier, with a cartridge thereon, will be raised, and during its rise will be moved forward until it may have reached its position, as shown in Fig. 1. The shell of the cartridge, while in the chamber, will close the joints thereof, in the manner as hereinbefore mentioned.

During the passage of the carrier *o* from its position as shown in Fig. 4 into that as represented in Fig. 1, the rear end of the said carrier will slide forward on the upper surface of the locking-piece P and off the key or catch *c*, and as soon as the carrier has introduced the cartridge into the barrel or chamber the piece P will be thrown up by the action of the spring *g*, and will lock the said carrier in position.

During the movement of the carrier *o* from its position as shown in Fig. 4 to that in Fig. 1 the hammer H will remain stationary and raised, as shown in Fig. 4, ready to be thrown down for discharging the cartridge, the blow of the hammer being forced by a main-spring, which, with the trigger to be applied to the tumbler, is not represented in the drawings. It will be impossible to explode the cartridge until the locking-piece P may have been forced into its locking position.

During the upward movement of the carrier *o* the flange of the cartridge within it will be moved in contact with the spring J, which, on entering a notch in the top of the carrier, and bearing on the flange, will serve to keep the cartridge in its proper position until it may enter or have passed into the chamber or bore of the arm. The hammer, by striking against the flange of the cartridge, explodes the priming thereof. At the moment the hammer is thrown against the cartridge the tumbler will have been turned around with respect to the projection *v* of the locking-piece P, as shown in Fig. 1, and so as to prevent any downward movement of the piece P during explosion of the cartridge.

After having discharged the fire-arm the hammer should be raised. During the descent of the hammer to explode the cartridge the key or catch *e* will be raised and locked onto the piece P, and will pull the said piece P downward during the elevation of the hammer. By depressing the lever R the carrier *o* will be moved backward on the piece P, and will be depressed at its front end. The shell of the cartridge in the meanwhile will be drawn out of the cartridge-chamber, and be thrown off or ejected from the carrier by the reaction of the spring D, after which another cartridge will be forced into place on the carrier, ready for being raised up to the chamber. During the rearward movement of the carrier *o* it will press the catch *f* out of action on the locking-piece P.

What I claim as my invention in the above-described fire-arm is as follows:

1. In a magazine fire-arm, the combination, substantially as described, of a barrel and magazine, both open at the breech, a frame to which the barrel and magazine are attached, and constructed with a vertical chamber in rear of said open end of barrel and magazine, with an opening through the side of the frame in rear of the magazine, through which the magazine is charged.

2. In a magazine fire-arm, the combination, substantially as described, of a barrel and magazine, both open at the breech, an opening in the side of the frame, through which the magazine is charged, and a carrier to receive a cartridge from the magazize and present it in line with the bore of the barrel.

3. The combination of the locking-piece P, the spring *g*, and catch *f* with the tumbler I and the carrier *o*, the whole being constructed and arranged in manner, and so as to operate, substantially as described.

4. In a magazine fire-arm, the carrier constructed, as described, so as to receive within it a cartridge from the magazine, to raise it up to the barrel or charge-chamber thereof, to form part of and serve as a breech to such chamber, and finally to withdraw the shell of the cartridge therefrom, all substantially as described.

ALBERT BALL.

Witnesses:
HERMON HOLT,
E. N. HOLT.